Jan. 22, 1935.  B. B. WATSON ET AL  1,988,639
BELT GUARD FOR RAILWAY GENERATORS OR THE LIKE
Filed Feb. 23, 1934
FIG. I.
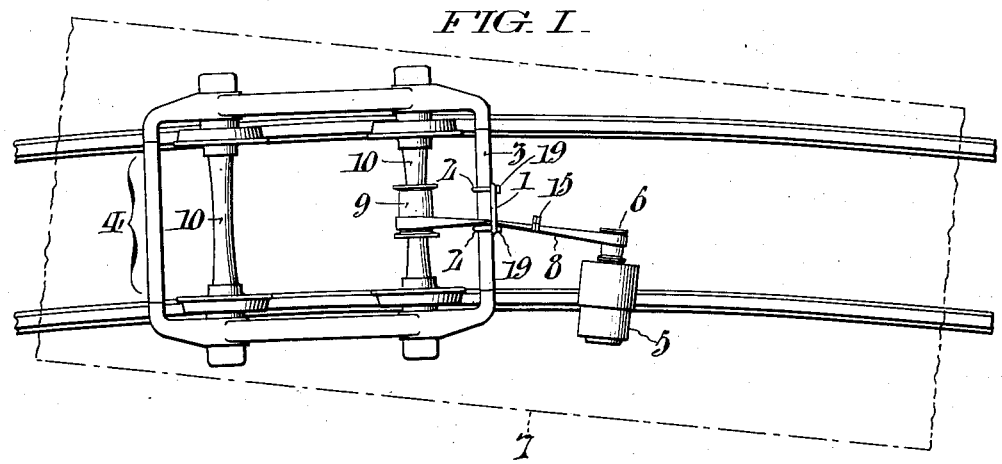
FIG. II.
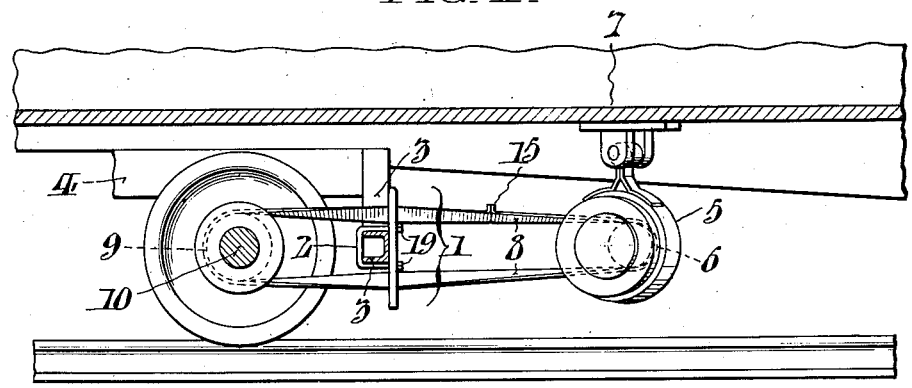
FIG. III.
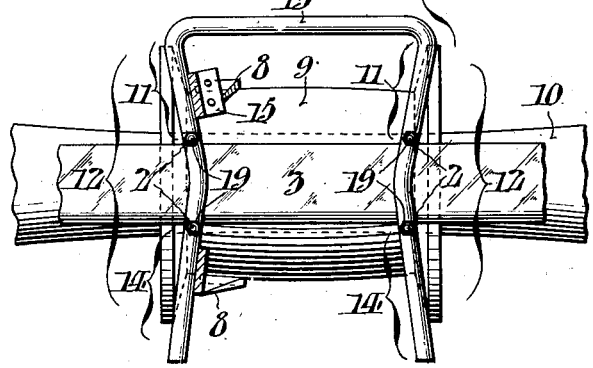
FIG. IV.
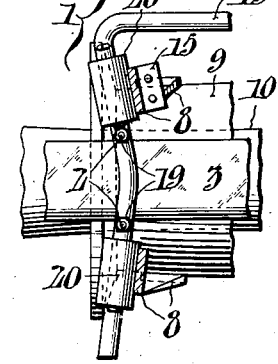
WITNESSES:
INVENTORS:
Bruce B. Watson &
William M. Keller,
BY
ATTORNEYS.

Patented Jan. 22, 1935

1,988,639

UNITED STATES PATENT OFFICE 1,988,639

BELT GUARD FOR RAILWAY GENERATORS OR THE LIKE

Bruce B. Watson, Altoona, and William M. Keller, Hollidaysburg, Pa.

Application February 23, 1934, Serial No. 712,642

4 Claims. (Cl. 105—101)

This invention relates to belt guards for pulleys, and more particularly to belt guards used on railway cars to retain the driving belt of the axle generator on its pulleys.

Electric car lighting equipments for railway cars are generally of the type in which a generator is mounted on the car body and driven from the car axle by a belt. When the car truck swings with respect to the body, the pulleys swing out of alignment with the belt, and this may cause the driving belt to ride off the pulleys. Even with flanges on the pulleys there is a danger that the driving belt will climb the flanges and ride off the pulleys under such circumstances. Such driving belts usually have fasteners joining their ends to make an endless belt, and certain of these fasteners project considerably from the outside surface of the belt when running on the pulleys. Hence any guiding action which might turn the edge of the belt under instead of outward would cause the fastener to catch on the guide, straining the joint and damaging the fastener. Further, a guiding action which acts mainly on the vertical edge of the belt causes transverse cracking along these edges due to the concentration of the pressure and wear on such a small area.

Therefore, the main object of this invention is the provision of a belt guard which will retain the belt on its pulleys as the pulleys swing out of alignment on the turning of the car trucks, by a guiding action effective on the running surface of the belt instead of on the outer surface or the outer edge surfaces of the belt.

Other objects and advantages of the invention will be apparent from the detailed description of a preferred embodiment thereof which follows and which has reference to the accompanying drawing.

Of the drawing:

Fig. I shows a plan view of our invention as attached to a car truck, the car body to which the generator is attached being indicated in dotted lines; and illustrates the operation of our invention when the car is on a curve in the track.

Fig. II shows a longitudinal section of apparatus embodying our invention with the car on a curve in the track, as shown in Fig. I, the car body and truck being partially indicated.

Fig. III shows an end view of our belt guard as attached to a truck end rail in line with an axle pulley, a belt being shown in section and guided in alignment with the axle pulley by the operation of the guard on the running surface of the belt.

Fig. IV shows a modified form of belt guard embodying our invention.

In the drawing a belt guard 1 is shown securely fastened by U-shaped supports 2 to the truck end rail 3 of car truck 4. A generator 5 having a generator pulley 6 is attached to the underside of a railway car 7 which is only partially indicated. Passing around the pulley 6 is a driving belt 8 which also passes around an axle pulley 9 mounted on an axle 10 of car truck 4. The upper portion of the driving belt 8 passes between upper parts 11 of sides 12 of belt guard 1 and between a connecting piece 13 of guard 1 and the truck end rail 3. The lower portion of the driving belt 8 passes underneath the truck end rail 3 and between lower parts 14 of the sides 12 of belt guard 1. The driving belt 8 is joined at its ends by a heavy fastener 15 which projects out from the outer surface of the belt 8, and is of a type commonly used in the art.

This belt guard 1 is preferably made from one-inch extra heavy iron pipe which has an external diameter of 1.315 inches. It is bent into a U-shape to form the sides 12 and the connecting piece 13. The sides 12 are bored at their central portions making two vertically spaced holes to receive the threaded ends of the U-shaped supports 2 which hold the guard 1 in place against the end rail 3 when assembled with nuts 19 drawn tight. The upper parts 11 and the lower parts 14 of the sides 12 are bent in the plane of the guard 1 to incline outwardly from the supports 2. The guard 1 is preferably of circular cross section to provide a rounded surface for the guiding action.

The modification shown in Fig. IV provides rollers 20 on the upper and lower parts 11 and 14 to lessen frictional wear on the belt 8 and the sides 12 during the guiding action of the sides 12.

In the operation of the belt 8, as a car goes around a curve, the belt 8 turns its pulley contacting or running surface, as to the top half of the belt, to the outwardly inclined upper parts 11, and, as to the bottom half of the belt to the outwardly inclined lower parts 14 of the guard 1. Thus the belt 8 is guided in alignment with both pulleys 9 and 6 and prevents the belt 8 from riding off either of the pulleys 9 or 6. The guiding action of the sides is diffused over the inner surface of the belt 8 instead of concentrated on the small area of the edges of the belt 8. The outer surface of the belt 8 with the outwardly projecting fastener 15 is effectually prevented from coming into contact with the guard 1, and damage to the fastener is consequently avoided.

This invention has been found to provide a simple and practical solution of the problem of keeping driving belts on the pulleys of generators having axle drive where the generator is not mounted on the car truck. It makes the use of flanges on these pulleys optional, and directs the main wear to the running surface of the belt, thus increasing the life of the belt for the reasons pointed out above.

While our invention has been described in some detail with reference to a specific embodiment, various changes in the form of apparatus used are within the contemplation of the invention. For example, it may be desirable to vary the distance of the belt guard from the axle pulley, or to utilize two guards, and the particular shape and cross sectional configuration of the supports may obviously be varied, all without departing from the spirit of our invention as hereinafter claimed.

Having thus described our invention, we claim:

1. The combination with a railway car truck having an end rail, of a driving pulley on an axle of said truck, a generator belt applied to said pulley, and a guard for said belt supported on said end rail, the sides of said belt guard being outwardly inclined from the place of support.

2. The combination of a truck including an axle mounted thereon having a driving pulley on said axle, a belt guard attached to said truck frame opposite said pulley, said guard having outwardly inclined vertical members extending upward and downward from said frame.

3. In combination with an axle driven generator, a belt guard supported between the axle and generator, said belt guard being U-shaped and having its vertical members inclined outwardly from the place of support.

4. The combination according to claim 1 characterized by the further fact that sides of said belt guard are provided with rollers to reduce frictional wear on said belt.

BRUCE B. WATSON.
WILLIAM M. KELLER.